US006617403B2

(12) United States Patent
Sukhadia et al.

(10) Patent No.: US 6,617,403 B2
(45) Date of Patent: Sep. 9, 2003

(54) OLEFIN POLYMERIZATION PROCESS

(75) Inventors: Ashish M. Sukhadia, Bartlesville, OK (US); Elizabeth A. Benham, Bartlesville, OK (US); Joseph J. Bergmeister, Bartlesville, OK (US); Rex L. Bobsein, Bartlesville, OK (US); Gerhard K. Guenther, Bartlesville, OK (US); Eric T. Hsieh, Bartlesville, OK (US); Max P. McDaniel, Bartlesville, OK (US); Steven J. Secora, Bartlesville, OK (US); Joseph S. Shveima, Bartlesville, OK (US); John D. Stewart, Friendswood, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/932,411

(22) Filed: Aug. 20, 2001

(65) Prior Publication Data
US 2002/0028891 A1 Mar. 7, 2002

Related U.S. Application Data

(63) Continuation of application No. 08/813,128, filed on Mar. 7, 1997, now abandoned.

(51) Int. Cl.$^7$ .................................................. C08F 4/22
(52) U.S. Cl. ................... 526/106; 526/348; 526/123.1; 526/130; 526/133; 502/103; 502/117; 502/202
(58) Field of Search ................................ 526/106, 348, 526/123.1, 130, 133; 502/103, 117, 202

(56) References Cited

U.S. PATENT DOCUMENTS

| 3,887,494 A | | 6/1975 | Dietz ......................... 252/452 |
| 4,312,967 A | * | 1/1982 | Norwood et al. ............. 526/64 |
| 5,071,927 A | * | 12/1991 | Benham et al. ............... 526/64 |
| 5,115,068 A | | 5/1992 | Bailey et al. ............ 526/348.5 |
| 5,274,056 A | | 12/1993 | McDaniel et al. .......... 526/106 |

* cited by examiner

*Primary Examiner*—Ling-Siu Choi
(74) *Attorney, Agent, or Firm*—Williams, Morgan & Amerson, P.C.

(57) ABSTRACT

A copolymer of ethylene and a higher alpha-olefin having broadened melt processing windows and reduced melt fracture can be produced using a chromium-containing catalyst system and a trialkyl boron cocatalyst. The polymerization process must be carefully controlled to produce a copolymer resin that easily can be made into articles of manufacture.

9 Claims, No Drawings

OLEFIN POLYMERIZATION PROCESS

This application is a continuation of application Ser. No. 08/813,128, filed Mar. 7, 1997 now abandoned, the disclosure of which is incorporated herein by reference.

BACKGROUND

This invention relates to the copolymerization of a mono-1-olefin monomer, such as ethylene, with a higher alpha-olefin comonomer.

It is well known that mono-1-olefins, such as ethylene, can be polymerized with catalyst systems employing vanadium, chromium or other metals on supports such as alumina, silica, aluminophosphate, titania, zirconia, magnesia and other refractory metals. Initially, such catalyst systems were used primarily to form homopolymers of ethylene. It soon developed, however, comonomers such as propylene, 1-butene, 1-hexene or other higher, mono-1-olefins were copolymerized with ethylene to provide resins tailored to specific end uses. Often, high density and/or high molecular weight copolymers can be used for blow molding applications and the blow molding process enables rapid processing into a desired molded product. Unfortunately, these copolymers often are plagued by various types of surface roughness as a result of a constant desire to increase processing rates.

This surface roughness has been described loosely in the past as having "melt fracture instabilities" or "worms". Worms, or melt fracture instabilities, can be defined broadly as irregularities and instabilities, such as anomalous, ridge-like structures, that are formed during melt processing and are clearly observed on the inside of an otherwise smooth, blow molded article. Worms can occur randomly and intermittently on either the interior or exterior surface of the molded article and can detach from the surface, causing unacceptable contamination of the contents or even structural degradation of the molded article. Generally, melt fracture instabilities are observed only on the interior of the molded article because the heat of the die, or mold, can cause smoothing of the exterior surface of the molded article.

Variance of the shear rates (extruder screw RPMs) for each type of copolymer can affect the melt fracture instabilities. At low shear rates, the extrudate usually is smooth and exhibits no melt fracture instabilities. As shear rates are increased, the extrudate can have a matte, or sharkskin-type, finish which is characterized by fine scale irregularities on the extrudate surface. At even higher shear rates, slip-stick, spurt, or cyclic melt fracture can be observed. At the slip-stick point, the pressure in the extruder periodically oscillates between high and low pressure. Worms are formed and can always be seen at the slip-stick point of an extrusion process, herein defined as the critical shear rate. Finally, as screw speed in increased even further, the copolymer can enter a period of continuous slip. Another way to describe critical shear rate is the overall velocity over the cross section of a channel in which molten polymer layers are gliding along each other or along the wall in laminar flow.

Most polymer processing operations occur within a limited window of extrusion (shear), or production, rates. Obviously, one way to avoid melt fracture instabilities is to limit, i.e., decrease, production rates and use very low extrusion rates. Thus, an improved polymer is one which either does not exhibit melt fracture instabilities at higher shear rates, i.e. has a higher critical shear rate. However, while it is possible to increase the critical shear rate by increasing polymer melt index and/or decreasing polymer molecular weight distribution, other polymer properties will be negatively affected. Therefore, it is very desirable to produce a polymer that does not encounter melt fracture instability, i.e., a polymer that has high critical shear rates. Furthermore, increasing polymer production rates into articles of manufacture while minimizing melt fracture instabilities is an efficient use of polymer product and processing equipment.

SUMMARY OF THE INVENTION

Therefore, it is an object of this invention to provide an improved olefin polymerization process.

It is another object of this invention to provide a process to produce copolymers of ethylene and mono-1-olefins that can be processed at increased production rates and have increased critical shear rates.

It is still another object of this invention to provide a process to produce copolymers of ethylene and mono-1-olefins that have a broadened melt processing window.

It is yet another object of this invention to provide a process to produce copolymers of ethylene and mono-1-olefins that have increased critical shear rates without the loss of other polymer physical properties.

It is still another object of this invention to provide a composition comprising copolymers of ethylene and mono-1-olefins having higher critical shear rates that can be processed at high production rates into articles of manufacture.

In accordance with this invention, herein is provided a polymerization process comprising contacting:
  a) ethylene monomer;
  b) at least one mono-1-olefin comonomer having from about 2 to about 8 carbon atoms per molecule;
  c) a catalyst system comprising chromium supported on a silica-titania support, wherein said support comprises less than about 5 weight percent titanium, based on the weight of the support, and wherein said catalyst system has been activated at a temperature within a range of about 900° F. to about 1050° F.; and
  d) a trialkyl boron compound,
  wherein said contacting occurs in a reaction zone in the absence of hydrogen, at a temperature within a range of about 180° F. to about 215° F.,
  and recovering an ethylene/mono-1-olefin copolymer.

In accordance with another embodiment of this invention, a copolymer comprising ethylene and a mono-1-olefin having from about 3 to about 8 carbon atoms per molecule is provided, wherein said copolymer has a density within a range of about 0.935 g/cc to about 0.96 g/cc; a high load melt index (HLMI) within a range of about 0.5 g/10 minutes to about 30 g/10 minutes; and a critical shear rate for the onset of slip-stick melt fracture of greater or equal to about 1000 $sec^{-1}$.

In accordance with this invention, there is provided a polymerization process consisting essentially of contacting:
  a) ethylene monomer;
  b) at least one mono-1-olefin comonomer having from about 2 to about 8 carbon atoms per molecule;
  c) a catalyst system comprising chromium supported on a silica-titania support, wherein said support comprises less than about 5 weight percent titanium, based on the weight of the support, and wherein said catalyst system has been activated at a temperature within a range of about 900° F. to about 1050° F.; and d) a trialkyl boron compound, wherein said contacting occurs in a reaction zone in the absence of hydrogen, at a temperature within a range of about 180° F. to about 215° F., and recovering an ethylene copolymer.

In accordance with another embodiment of this invention, a copolymer consisting essentially of ethylene and a mono-1-olefin having from about 3 to about 8 carbon atoms per molecule is provided, wherein said copolymer has a density within a range of about 0.935 g/cc to about 0.96 g/cc; a high load melt index (HLMI) within a range of about 0.5 g/10 minutes to about 30 g/10 minutes; and a critical shear rate for the onset of slip-stick melt fracture of greater or equal to about 1000 sec$^{-1}$.

DESCRIPTION OF THE PREFERRED EMBODIMENTS

The terms "polymer" and "copolymer" are used interchangeably in this disclosure. Both terms include a polymer product resulting from polymerizing ethylene monomer and a mono-1-olefin, or higher alpha-olefin, comonomer, selected from the group consisting of propylene, 1-butene, 1-pentene, 1-hexene, 1-octene, and/or 4-methyl-1-pentene.

Catalyst Systems

As used in this disclosure, the term "support" refers to a carrier for another catalytic component. However, by no means, is a support necessarily an inert material; it is possible that a support can contribute to catalytic activity and selectivity.

The catalyst system support used in this invention must be a silica-titania support. As used in this disclosure, references to "silica" mean a silica-containing material generally composed of 80 to 100 weight percent silica, the remainder, if any, being selected from one or more inorganic oxides, as disclosed in the art, useful as catalyst system supports. For instance, a silica-containing material can consist essentially of silica and no more than 0.2 weight percent of alumina or other metal oxides. Other ingredients which do not adversely affect the catalyst system or which are present to produce some unrelated result can also be present. The support must contain less than about 5 weight percent titanium (Ti), based on the weight of the support. Preferably, the support comprises from 2 to about 5, most preferably 2 to 4, weight percent titanium, in order to produce a polymer with the most desirable physical properties.

Silica-titania supports are well known in the art and can be produced as disclosed in Dietz, U.S. Pat. No. 3,887,494, the disclosure of which is hereby incorporated by reference.

The catalyst component must be a chromium compound. The chromium compound, or component, can be combined with the silica-titania support in any manner known in the art, such as by forming a coprecipitated tergel of the silica, titanium, and chromium components. Alternatively, an aqueous solution of a water soluble chromium component can be added to a hydrogel of the silica-titania component. Suitable water soluble chromium compounds include, but are not limited to, chromium nitrate, chromium acetate, and chromium trioxide. Alternatively, a solution of a hydrocarbon soluble chromium component, such as tertiary butyl chromate, a diarene chromium compound, biscyclopentadienyl chromium(II) or chromium acetylacetonate, can be used to impregnate the silica-titania xerogel which results after removal of water from the cogel.

The chromium component is used in an amount sufficient to give about 0.05 to about 5, preferably 0.5 to 2 weight percent chromium, based on the total weight of the chromium and support after activation.

The resulting chromium component on a silica-titania support then is subjected to activation in an oxygen-containing ambient in any manner conventionally used in the art. Because of economy, the preferred oxygen-containing ambient is air, preferably dry air. Activation can be carried out at an elevated temperature for about one-half to about 50 hours, preferably for about 2 to about 10 hours, at a temperature within a range of about 900° F. to about 1050° F. (about 455° C. to about 565° C.), preferably from about 965° F. to about 1020° F. (about 520° to about 550° C.). Under these calcination conditions at least a substantial portion of any chromium in a lower valence state is converted to the hexavalent form.

After calcination or activation, the oxidized, supported catalyst system is cooled to about room temperature, e.g. about 25° C., under an inert atmosphere, such as argon or nitrogen. The catalyst system must be kept away from contact with reducing compounds, water, or other detrimental, or deactivating, compounds until use. The catalyst system used in the inventive process must not be subjected to a reduction treatment. A reduction treatment can cause narrowing of the molecular weight distribution (MWD). This MWD narrowing can increase the critical shear rate for the onset of melt fracture instabilities during polymer processing and can result in surface roughness of the extruded article of manufacture.

A cocatalyst must be used in conjunction with the catalyst system; the cocatalyst must be a trialkyl boron compound, wherein the alkyl group has from about 1 to about 12 carbon atoms, preferably about 2 to about 5 carbon atoms per alkyl group. Exemplary trialkyl boron compounds include, but are not limited to, tri-n-butyl borane, tripropylborane and triethylborane (TEB). These cocatalysts can be effective agents to improve resultant polymer properties, such as, for example, reducing melt flow and retarding polymer swelling during polymerization. By far, the most preferred cocatalyst is triethylboron (TEB), due to ease of use in the polymerization reactor and best improvement of polymer properties.

The trialkyl boron cocatalyst can be used in an amount within a range of about 1 to about 20 parts per million (ppm), or milligrams per kilogram (mg/kg), based on the mass of ethylene monomer in the reactor. Preferably, the cocatalyst is used in an amount within a range of about 2 to about 10 ppm, and most preferably, within a range of about 3 to about 6 ppm, for cost effectiveness and best polymer properties.

Optionally, the trialkyl boron cocatalyst can be used in conjunction with a small amount of trialkyl aluminum cocatalysts. While not wishing to be bound by theory, it is believed that a small amount of a trialkyl aluminum cocatalyst can be used as a preservative for the trialkyl boron cocatalyst, to protect the trialkyl boron cocatalyst from inadvertent contact with air, or oxygen.

Exemplary trialkyl aluminum cocatalysts include, but are not limited to, triethylaluminum, ethylaluminum sesquichloride, diethylaluminum chloride, and mixtures thereof. Preferably the trialkyl aluminum cocatalyst is triethyl aluminum for best catalyst system and trialkyl boron cocatalyst compatibility.

The trialkyl aluminum cocatalyst, if used, can be used in an amount within a range of about 0.1 to about 5 parts per million (ppm), or milligrams per kilogram (mg/kg), based on the mass of diluent in the reactor. Preferably, the trialkyl aluminum cocatalyst is used in an amount within a range of about 0.5 to about 3 ppm, and most preferably, within a range of about 0.5 to about 2 ppm, for cost effectiveness and best polymer properties.

Reactants

Polymers produced according to the process of this invention must be copolymers. This inventive process is of particular applicability in producing copolymers of ethylene and higher alpha-olefins. Ethylene monomer must be polymerized with a comonomer selected from the group consisting of propylene, 1-butene, 1-pentene, 1-hexene, 1-octene, 4-methyl-1-pentene, and mixtures thereof. Ethylene is the most preferred monomer, due to the advantageous properties of the resultant copolymer. Preferably, the comonomer is 1-hexene and/or 4-methyl-1-pentene to achieve maximum polymer toughness.

Comonomer is added to the polymerization reactor, or reaction zone, in an amount within a range of about 0.5 to about 15 weight percent, preferably within a range of about 1 to about 10 weight percent, based on the weight of monomer. Most preferably, the comonomer is present in the reaction zone within a range of about 2 to about 6 weight percent in order to produce a polymer with the most desired properties, such as, for example, reduced melt fracture instabilities. Another method to express the amount of comonomer is to specify the amount measured in the reactor flash gas. Generally, the amount of comonomer present in the reactor flash gas is in an amount within a range of about 0.05 to about 6 mole percent, based on the reactor diluent, such as isobutane. Preferably, the cocatalyst is present in the flash gas in an amount within a range of about 0.1 to about 2 mole percent, and most preferably, within a range of about 0.3 to about 1 mole percent, for cost effectiveness and best polymer properties.

Polymerization

Polymerization of ethylene and the comonomer must be carried out under slurry, or particle form, polymerization reaction conditions wherein the reactor temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The temperature of the polymerization reactor, or reaction zone, according to this invention, is critical and must be kept within a range of about 180° F. to about 215° F. (about 82° C. to about 102° C.), preferably within a range of about 180° F. to about 195° F. (about 82 to about 90° C.). Most preferably, the reaction zone temperature is within a range of 180° F. to 185° F. (82° C. to 85° C.). Although higher reactor temperatures can be used, operating outside of the specified temperature ranges can produce a copolymer which can be more subject to swelling during polymerization or higher melt fracture instabilities.

The slurry process generally is carried out in an inert diluent (medium), such as, for example, a paraffin, cycloparaffin, and/or aromatic hydrocarbon. Exemplary diluents include, but are not limited to propane, n-butane, isobutane, n-pentane, 2-methylbutane (isopentane), and mixtures thereof. Isobutane is the preferred diluent due to low cost and ease of use.

Pressures in the slurry polymerization process can vary from about 110 to about 700 psia (0.76–4.8 MPa) or higher. The catalyst system is kept in suspension and can be contacted with the monomer and comonomer(s) at sufficient pressure to maintain the medium and at least a portion of the monomer and comonomer(s) in the liquid phase. The medium and temperature are thus selected such that copolymer is produced as solid particles and copolymer is recovered in that form. Catalyst system concentrations in the reactor can be such that the catalyst system content ranges from 0.001 to about 1 weight percent based on the weight of the total reactor contents.

Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium catalyst system can be utilized either before or after a reactor utilizing a different catalyst system. In another instance, a chromium catalyst system can be utilized in parallel with another reactor employing a polymerization different catalyst system and the resulting polymerization products can be combined prior to recovering a copolymer.

In accordance with this invention, hydrogen cannot be present in the polymerization reactor during polymerization. The presence of hydrogen results in a decrease and lowering of the critical shear rate for the onset of melt fracture for the resultant polymer product. While not wishing to be bound by theory, it is believed that the absence of hydrogen can leave a high molecular weight tail on the polymer which results in a broader molecular weight distribution. Polymers having a broader molecular weight distribution can have less melt fracture, i.e., a higher critical shear rate.

The catalyst system, cocatalyst, monomer, and comonomer can be added to the reaction zone in any order, according to any method known in the art. For example, the catalyst system, cocatalyst, monomer, and comonomer can be added simultaneously to the reaction zone. If desired, the catalyst system and cocatalyst can be precontacted under an inert ambient prior to contacting the monomer and/or comonomer.

Optionally, precontacting of the catalyst system and cocatalyst prior to the catalyst system contacting ethylene can reduce the amount of cocatalyst necessary in the reaction zone. This precontacting can reduce the amount of trialkyl boron cocatalyst necessary in the reactor zone by up to a factor of ten (10).

Product

Polymers produced in accordance with this invention are a copolymer of ethylene and at least one higher mono-1-olefin comonomer. Copolymers produced according to this invention have a broad molecular weight distribution and therefore have higher critical shear rates and reduced melt fracture instabilities. Additionally, the production rate of these copolymers into articles of manufacture can be significantly increased; consequently, copolymers produced according to this invention exhibit higher production rates during blow molding processes.

The density of these novel copolymers usually is within a range of about 0.935 g/cc to about 0.96, preferably from about 0.94 to about 0.958 g/cc. Most preferably, the copolymer density is within a range of about 0.945 to about 0.955 g/cc.

Another defining physical characteristic of these copolymers is the high load melt index (HLMI). Usually, the HLMI is within a range of about 0.5 to about 30 g/10 minutes, preferably within a range of about 3 to about 10 g/10 minutes. Most preferably, the HLMI is within a range of about 4 to about 8 g/10 minutes.

Copolymers produced according to this invention also have very high critical shear rates. Generally, the critical shear rate for the onset of melt fracture of these novel polymers is greater than or equal to about 1000 sec$^{-1}$, preferably greater than or equal to about 1500 sec$^{-1}$. Most preferably, the critical shear rate of polymers produced in accordance with this invention is within a range of about 1800 sec$^{-1}$ to about 6000 sec$^{-1}$.

A further understanding of the present invention and its advantages are provided by reference to the following examples.

EXAMPLES

Ethylene-hexene copolymers were prepared in a continuous particle form process by contacting the catalyst with the monomers, employing a liquid full loop reactor, having a volume of 23 gallons (87 liters), isobutane as the diluent, and occasionally some hydrogen, as shown in the Examples. The reactor was operated to have a residence time of 1.25 hrs. The reactor temperature was varied over the range of 180° C. to 215° C., unless stated differently, and the pressure was 4 MPa (580 psi). At steady state conditions, the isobutane feed rate was 46 1/hr, the ethylene feed rate was about 30 lbs/hr, and the 1-hexene feed rate was varied to control the density of the product polymer. Polymer was removed from the reactor at the rate of 25 lbs/hr. The catalyst systems used were commercially available catalyst systems purchased from W. R. Grace and Company, the Davison business unit, designated as 963 Magnapore®.

Polymer product was collected from each run and tested according to the following procedures:

Density (g/ml): ASTM D 1505-68 and ASTM D 1928, Condition C. Determined on a compression molded sample, cooled at about 15° C. per minute, and conditioned at room temperature for about 40 hours.

High Load Melt Index (HLMI)(g/10 min): ASTM D 1238, condition E. Determined at 190° C. with a 21,600 gram weight.

Heterogeneity Index (HI): $M_w/M_n$

Critical Shear Rate (Onset of Worms) (sec$^{-1}$): The determination of Critical Shear Rate was developed by Dr. Ashish Sukhadia for Phillips Petroleum Company as a result of a need to accurately determine the onset of worms. The testing apparatus is an Extruder Capillary Set-Up which consists of a one (1) inch Killion® (KL-100) single screw extruder that is used to provide a pressurized polymer melt to a die through a connecting adaptor. Each die consists of two separate pieces: 1) an entry die (zero land length) and 2) a land die (a die having the same diameter as the entry die but with a land, constant diameter, region). A complete determination results in a flow curve for the tested material.

The procedure consists of extruding the material (polymer) first with the entry die alone. The flow rate, pressure drop in the extruder, pressure drop in the adaptor (mounter just prior to the dies) and melt temperature are recorded. Then, a land die of desired land length is fitted at the end of the entry die and the experimental procedure is repeated. In addition to the data, the visual appearance of the extrudate (strand) is recorded for both the entry die and entry die plus land die experiments. The data are used to calculate the apparent shear rate and shear stress. Standard calculation methods are used; see C. D. Han, *Rheology on Polymer Processing*, pp 89–126, Academic Press, NY (1976). In addition, a graphic plot of the flow curve (true shear stress vs. apparent shear stress) is plotted. The following calculations are used:

$$\Upsilon_{app} = \frac{(32)(Q)}{(\pi)(D)^3} \quad \text{Equation (1)}$$

$$\tau_{app} = \frac{\Delta P}{4(L/D)} \quad \text{Equation (2)}$$

$$\tau_{true} = \frac{\Delta P - \Delta P_{ent}}{4(L/D)} \quad \text{Equation (3)}$$

where

L=Land length of capillary, inch

D=Diameter of capillary die, inch=Diameter of land die, inch

Q=volumetric Flow Rate, inch$^3$/sec $\Upsilon_{app}$=Apparent Shear Rate, 1/sec $\tau_{app}$=Apparent Shear Stress, MPa $\tau_{true}$=True (Corrected) Shear Stress, MPa $\Delta P_{ent}$=Entrance Pressure Drop, MPa=Pressure Drop through orifice die $\Delta P$=Total Pressure Drop, MPa=Pressure Drop through orifice+land die The following dies and conditions were used:

Entry die diameter: 0.080 inch, 90° cone entry angle

Land die: 0.080 inch diameter, 2.25 inch land length (L/D ratio=15)

Temperature: 215° C. flat temperature profile for extruder and capillary

Example 1

Polymer samples were prepared as described above. Different catalyst system activation and different levels of triethylboron (TEB) were used. Triethylaluminum (TEA) was not added to the reactor. Runs 105 and 106 are commercially available polymers, used for comparison.

TABLE 1

| Run | Catalyst Activation, ° C. | Reactor Temp, ° F. | TEB, mg/kg | Density, g/cc | HLMI, g/10 mins | HI, (Mw/Mn) | Critical Shear Rate, Sec$^{-1}$ |
|---|---|---|---|---|---|---|---|
| 101 | 1100 | 200 | 0 | 0.953 | 5.2 | 34 | 359 |
| 102 | 1100 | 200 | 2 | 0.953 | 6.4 | 57 | 349 |
| 103 | 1000 | 194 | 2.1 | 0.954 | 9.5 | 49 | >2200 |
| 104 | 1000 | 195 | 1.1 | 0.949 | 9.4 | 47 | >2200 |
| 105[a] | N/A | N/A | N/A | 0.955 | 6.7 | 32 | 487 |
| 106[b] | N/A | N/A | N/A | 0.956 | 5.4 | 32 | 484 |

TABLE 1-continued

| Run | Catalyst Activation, °C. | Reactor Temp, °F. | TEB, mg/kg | Density, g/cc | HLMI, g/10 mins | HI, (Mw/Mn) | Critical Shear Rate, Sec$^{-1}$ |
|---|---|---|---|---|---|---|---|

(a)Commercially available polyethylene from Mobile, HYA.
(b)Commercially available polyethylene from Novacor.
N/A = Not available.

The data in Table 1 show that TEB can be used in conjunction with a chromium catalyst system to reduce melt fracture. Comparison of Run 101 with 102 and Run 103 with 104 shows that higher levels of TEB desirably delay the onset of melt fracture, or worms, by allowing higher (faster) extruder screw speeds. The data in Table 1 further demonstrate that a lower catalyst activation temperature also can raise the onset of worms.

Example 2

Polymer samples were prepared as described above. Different catalyst system activation temperatures and different levels of triethylboron (TEB) were used. Triethylaluminum (TEA) was not added to the reactor.

TABLE 2

| Run | Activation Temperature (°F.) | Hydrogen H2/C2 = (mole ratio) | TEB (ppm in i-C4=) | Critical Shear Rate (Onset of Worms) (1/sec) |
|---|---|---|---|---|
| 201 | 1100 | 100 | 5.9 | 1800 |
| 202 | 1100 | 0.2 | 6.2 | 1080 |
| 203 | 1000 | 0 | 5.3 | >2200 |
| 204 | 1000 | 0 | 5.4 | >2200 |
| 205 | 1000 | 0.144 | 5.8 | 1650 |

The data in Table 2, again, demonstrate that lower catalyst system activation temperatures can postpone the onset of worms, until higher extruder speeds. The data in Table 2 also show that the absence of hydrogen in the polymerization reactor allows higher extruder throughputs, or screw speeds, before the onset of worms.

While this invention has been described in detail for the purpose of illustration, it is not to be construed as limited thereby but is intended to cover all changes and modifications within the spirit and scope thereof.

That which is claimed:

1. A polymerization process comprising contacting in a reaction zone, at a temperature within a range of about 180° F. to about 215° F., in the absence of hydrogen:
    a) ethylene monomer;
    b) at least one mono-1-olefin comonomer having from about 2 to about 8 carbon atoms per molecule;
    c) a catalyst system comprising chromium supported on a silica-titania support, wherein said support comprises from about 2 to about 10 weight percent titanium, based on the weight of the support, and wherein said catalyst system has been activated in oxygen at a temperature within a range of about 900° F. to about 1050° F. and has not been subjected to a reduction treatment; and
    d) a trialkyl boron compound;
    and recovering an ethylene/mono-1-olefin copolymer, wherein the ethylene/mono-1-olefin copolymer has a critical shear rate for the onset of melt fracture greater than about 1900 sec$_{-1}$.

2. A process according to claim 1 wherein said reaction zone temperature is within a range of about 180° F. to about 195° F.

3. A process according to claim 1 wherein said mono-1-olefin comonomer is selected from the group consisting of propylene, 1-butene, 1-pentene, 1-hexene, 1-octene, 4-methyl-1-pentene, and mixtures thereof.

4. A process according to claim 1 wherein said catalyst system is activated at a temperature within a range of about 965° F. to about 1020° F.

5. A process according to claim 1 wherein said trialkyl boron compound is selected from the group consisting of tri-n-butyl borane, tripropylborane, triethylborane, and mixtures thereof.

6. A process according to claim 3 wherein said comonomer is 1-hexene.

7. A process according to claim 5 wherein said trialkyl borane compound is triethylborane.

8. A process according to claim 1 wherein said ethylene copolymer comprises:
    a) a density within a range of about 0.935 g/cc to about 0.96 g/cc; and
    b) a high load melt index within a range of about 0.5 g/10 minutes to about 30 g/10 minutes.

9. A process according to claim 1 wherein said catalyst system is activated at a temperature within a range of about 965° F. to about 1020° F.

* * * * *

UNITED STATES PATENT AND TRADEMARK OFFICE
CERTIFICATE OF CORRECTION

PATENT NO.    : 6,617,403 B2  
DATED         : September 9, 2003  
INVENTOR(S)   : Ashish M. Sukhadia et al.

It is certified that error appears in the above-identified patent and that said Letters Patent is hereby corrected as shown below:

Title page,
Item [75], for the last named inventor, "John D. Stewart", delete the name of the state "OK" and insert -- TX --.

Column 10,
Line 23, delete "$sec_{-1}$" and insert -- $sec^{-1}$ --.

Signed and Sealed this

Fourth Day of November, 2003

JAMES E. ROGAN  
*Director of the United States Patent and Trademark Office*